United States Patent [19]
Chacon

[11] Patent Number: 5,083,437
[45] Date of Patent: Jan. 28, 1992

[54] REMOTELY SETTING THERMOSTATIC SWITCH ASSEMBLY AND REFRIGERATION SYSTEM EMPLOYING SAME

[75] Inventor: M. Frank Chacon, Elkmont, Ala.
[73] Assignee: Eaton Corporation, Cleveland, Ohio
[21] Appl. No.: 656,277
[22] Filed: Mar. 26, 1991

Related U.S. Application Data

[62] Division of Ser. No. 510,641, Apr. 18, 1990.
[51] Int. Cl.⁵ ............................................. F25B 49/02
[52] U.S. Cl. ........................................ 62/115; 62/227; 236/51
[58] Field of Search ............... 62/227, 115, 229, 163; 236/47, 51

[56] References Cited

U.S. PATENT DOCUMENTS

| | | | |
|---|---|---|---|
| 2,586,506 | 2/1952 | Bixler | 62/229 X |
| 2,672,017 | 3/1954 | Muffly | 62/227 X |
| 2,918,804 | 12/1959 | Iglehart | 62/227 X |
| 4,510,480 | 4/1985 | Rossi et al. | 337/117 X |
| 4,748,819 | 6/1988 | Takahashi | 62/227 X |
| 4,926,654 | 5/1990 | Johnson | 62/229 |
| 4,944,160 | 7/1990 | Malone et al. | 62/227 X |

*Primary Examiner*—William E. Tapolcai
*Attorney, Agent, or Firm*—R. A. Johnston

[57] ABSTRACT

A remotely changeable thermostat for a refrigeration or air conditioning system and method and system employing same. The thermostat has a fluid filled capsule with a diaphragm movably responsive to fluid expansion and contraction for actuating, via lever means, a compressor power switch. The capsule senses temperature via a fluid filled capillary. A separate remote user activated switch energizes an electrical actuator for moving the fulcrum of the lever means to change the sensed temperature of the evaporator at which the power switch is actuated. The user activates a remote switch to energize an electrical heater coil for heating a bimetal strip which moves the fulcrum for the lever means between a high or low temperature setting for compressor power switch actuation in response to user opening or closing the remote heater switch.

8 Claims, 3 Drawing Sheets

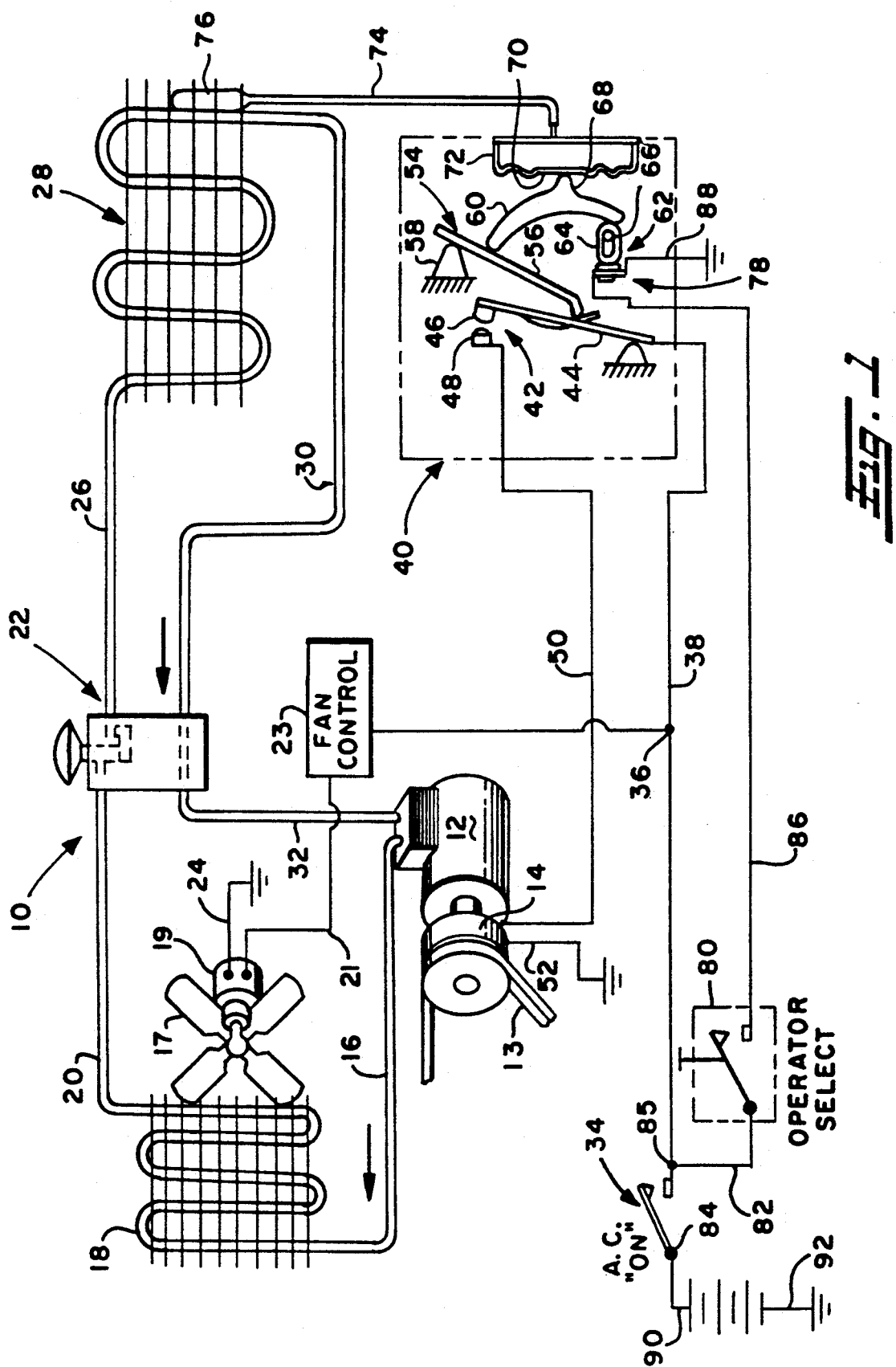

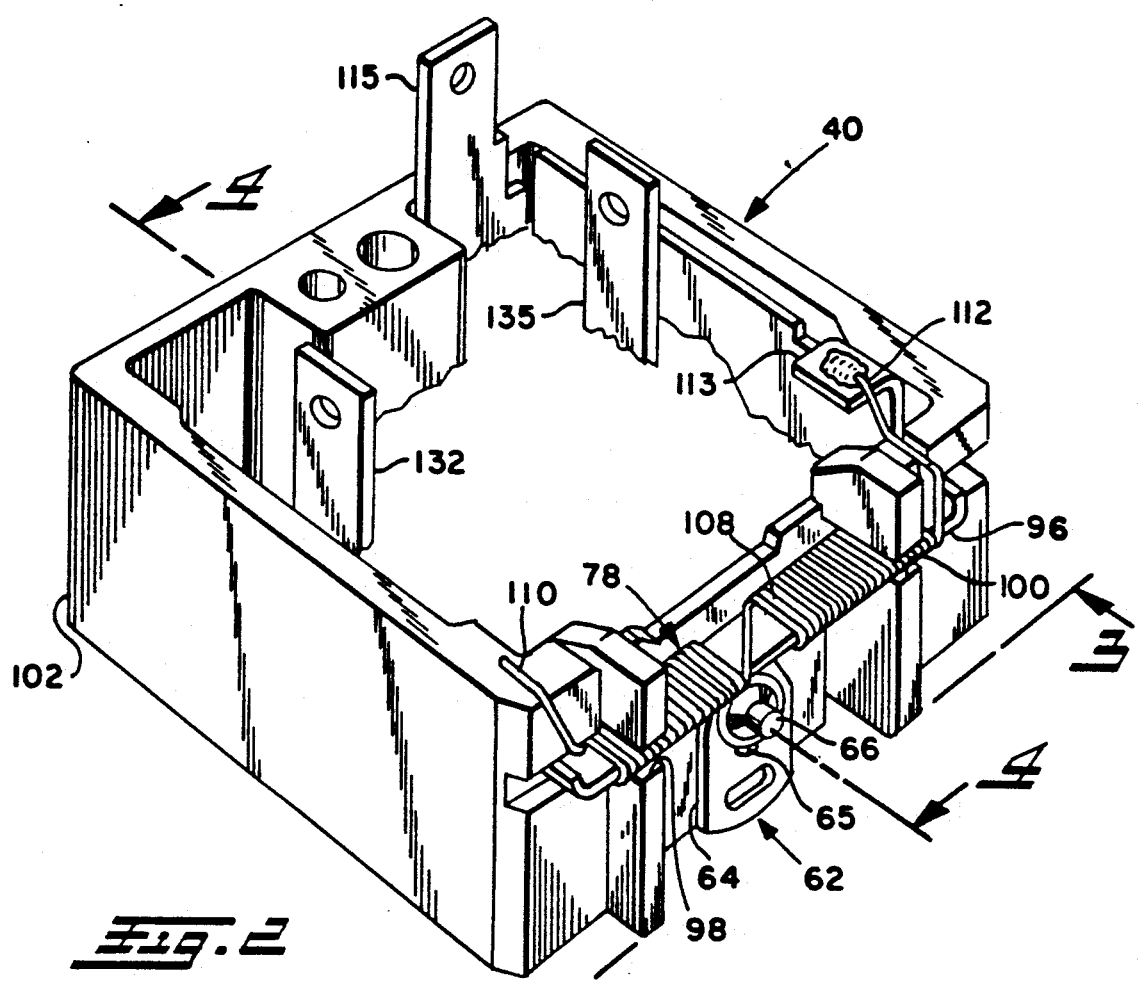
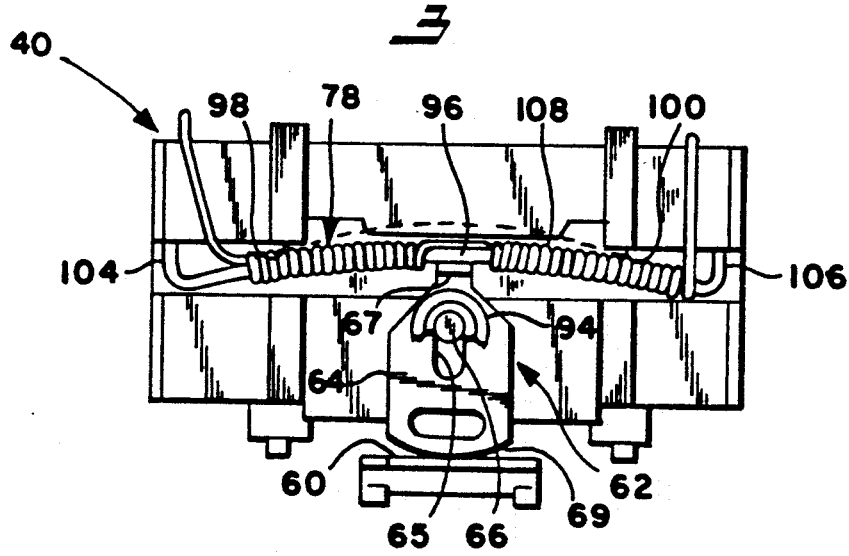

REMOTELY SETTING THERMOSTATIC SWITCH ASSEMBLY AND REFRIGERATION SYSTEM EMPLOYING SAME

This application is a division of application Ser. No. 510,640, filed Apr. 18, 1990.

BACKGROUND OF THE INVENTION

The present invention relates to thermostatic switch assemblies of the type employing a temperature responsive element operative to effect actuation and deactuation of an electrical switch for controlling current flow to a load circuit.

Thermostatic assemblies of the aforesaid type are often employed for controlling current flow to a compressor motor for a stationary refrigeration or air conditioning system and in vehicular applications to control current flow to the compressor clutch where the clutch is driven by a power transmission connected to the vehicle engine.

Thermostatic switch assemblies typically employ a temperature responsive member such as a fluid filled capsule having a movable diaphragm-wall portion or a bimetal element which moves upon experiencing changes in the sensed temperature. In refrigeration control systems either stationary or vehicular, it is desired to sense the temperature of the refrigerant flowing at certain locations in the circuit such as for example, at the evaporator and to effect cycling of the compressor in response to preselected sensed temperatures.

Thermostatic switch assemblies of the aforesaid mechanical type have been proven inexpensive to manufacture in high volume and reliable over extended periods of operation in the environments to which refrigeration systems are subjected.

However, in certain applications such as automotive air conditioning systems it has been desired to provide for a change of mode of operation in which the compressor clutch is cycled. It has been desired to maintain the refrigerant in the evaporator at slightly higher values in order to shorten the compressor duty cycle and effect economy of operation of the vehicle, inasmuch as the additional load of the compressor is applied to the engine for minimum time periods in order to effect a satisfactory level of passenger compartment comfort. It has been also desired to provide a "Maximum Cool Down" mode of operation for a vehicle air conditioning system and particularly where the vehicle has been sitting in the sun for extended periods of time and the passenger compartment is at intolerable elevated temperature levels upon initial entry of the passengers.

If the temperature settings for the compressor cycling are established at values to maintain the evaporator at the lowest permissible temperature for effecting maximum cooling of the passenger compartment, the compressor will cycle for unnecessarily long periods of time in order to maintain the evaporator at a minimum temperature for fastest cooling.

Accordingly it has been desired to provide a vehicle air conditioning system in which the system could be initially operated for cooling the evaporator to the minimum temperature permissible without causing freezing and ice formation on the surface of the evaporator, to provide Maximum Cool Down. It has further been desired to enable the system to be later switched by the user or vehicle operator to a mode of operation wherein a lesser amount of cooling is employed to thereafter maintain the passenger compartment at a desired comfort level.

However, in the past where mechanical temperature sensing or pressure sensors have been employed at the evaporator to determine refrigerant temperature, in order to provide a dual mode of operation it has been necessary to provide separate sensors having different temperature settings and to switch between sensors. Therefore, it has been desired to provide a refrigeration system and particularly an automotive vehicle air conditioning system wherein reliable mechanical temperature sensing means are employed for monitoring evaporator temperature to actuate and deactuate a switch for cycling the electrical compressor drive clutch and to provide remote changing of the cycling temperatures for the compressor and yet maintain the reliability of the mechanical temperature sensing devices.

However, it has not been known how to remotely change the temperature setting of a mechanical temperature sensor or thermostat once installed in the system. It has been particularly desired to find a way to remotely control the thermostat when located on the evaporator or on the suction return line in the engine compartment of the vehicle.

SUMMARY OF THE INVENTION

The present invention provides a unique and novel control system for a refrigeration system and particularly an automotive vehicle air conditioning system wherein a way or means is provided for permitting the vehicle operator or occupant to remotely change the duty cycle of the air conditioning compressor by selecting a relatively high or low setting for a thermostat which senses the temperature of the refrigerant circulating through the evaporator and controls the temperature at which the compressor clutch is energized and de-energized. In a first or "Economy" mode of operation where the primary temperature is selected the thermostat is mechanically altered by electrically operated means switched on or off as may be desired by actuation of the vehicle operator select switch located in the passenger compartment. In the first mode the compressor operates to maintain the evaporator temperature at a first or higher selected level to thereby reduce the operating time for the compressor and minimize the power drain on the vehicle engine. For given ambient conditions and the "Economy" mode minimizes the portion of the driving time in which the engine is loaded with the air conditioning compressor; and, thus effects minimum loss of fuel economy attributable to operation of the air conditioning system.

The second mode of operation for "Maximum Cool Down" mode enables the vehicle operator to change the mechanical thermostat via a remotely positioned electrical operator select switch in the passenger compartment to cause a change in the setting of the thermostat which controls the compressor clutch cycling in response to a sensed evaporator temperature. A Maximum Cool Down mode of operation is generally desired when the vehicle has been sitting for an extended period of time in the sun.

The present invention employs a mechanically operated temperature sensor preferably a fluid filled capillary and bulb type but which may also comprise a bimetal device for actuating an electric switch in response to the sensed refrigerant or evaporator temperature reaching a preselected level. Actuation of the electric switch energizes the vehicle refrigerant compressor clutch which operates until the evaporator temperature reaches a preselected level at which point the sensor via a lever means deactuates the switch to de-energize the compressor clutch.

The lever means employed between the temperature sensor and the electric switch is fulcrummed on the switch housing. In the preferred form, the pressure sensor comprises a fluid filled pressure capsule having a portion of the wall formed as a diaphragm which acts against one end of the lever means for actuating the electric switch.

The lever means is fulcrummed on the switch housing by means of a member slidably mounted on the switch housing for movement between predetermined limits. An electrically energized actuator is selectively operated by the vehicle operator opening or closing a remote operator select switch to provide power to an electrically energized actuator for moving the fulcrum member between its limits. In the preferred embodiment, the electric actuator comprises the bimetal element heated by an electric coil provided thereon.

The present invention thus employs a mechanically actuated thermostat for a refrigerant compressor, particularly for a vehicle air conditioning system, which may have the settings of the thermostat varied by energizing an electrically heated actuator for changing the fulcrum of the lever means between the temperature sensor of the thermostat and the electric load switch. The present invention thus permits the vehicle operator to select as between a high or low temperature setting at which it is desired to energize the vehicle compressor clutch for either a "Maximum Cool Down" or "Economy" mode of operation.

It is an object of the present invention to provide a method and way or means of enabling the user to remotely change the sensed refrigerant temperature at which a compressor is cycled in a refrigeration system. More particularly, it is an object to enable a user to remotely change the sensed refrigerant temperatures at which a vehicle air conditioning compressor clutch is cycled for rapid cooling or energy conserving modes of operation. It is another object of the invention to provide a mechanically actuated thermostat employing lever means between the temperature sensor and the load controlling switch with a remotely energizable electrical actuator for changing the position of the fulcrum point of the lever means for changing the actuation temperature of the load switch.

BRIEF DESCRIPTION OF THE DRAWINGS

FIG. 1 is a pictorial schematic of a vehicle air conditioning system employing the present invention;

FIG. 2 is a somewhat perspective view of a portion of the thermostat employed in the embodiment of FIG. 1;

FIG. 3 is a view taken along view-indicating lines 3—3 of FIG. 2 and shows in further detail the thermostat of FIG. 2.

DETAILED DESCRIPTION

Figure 4:
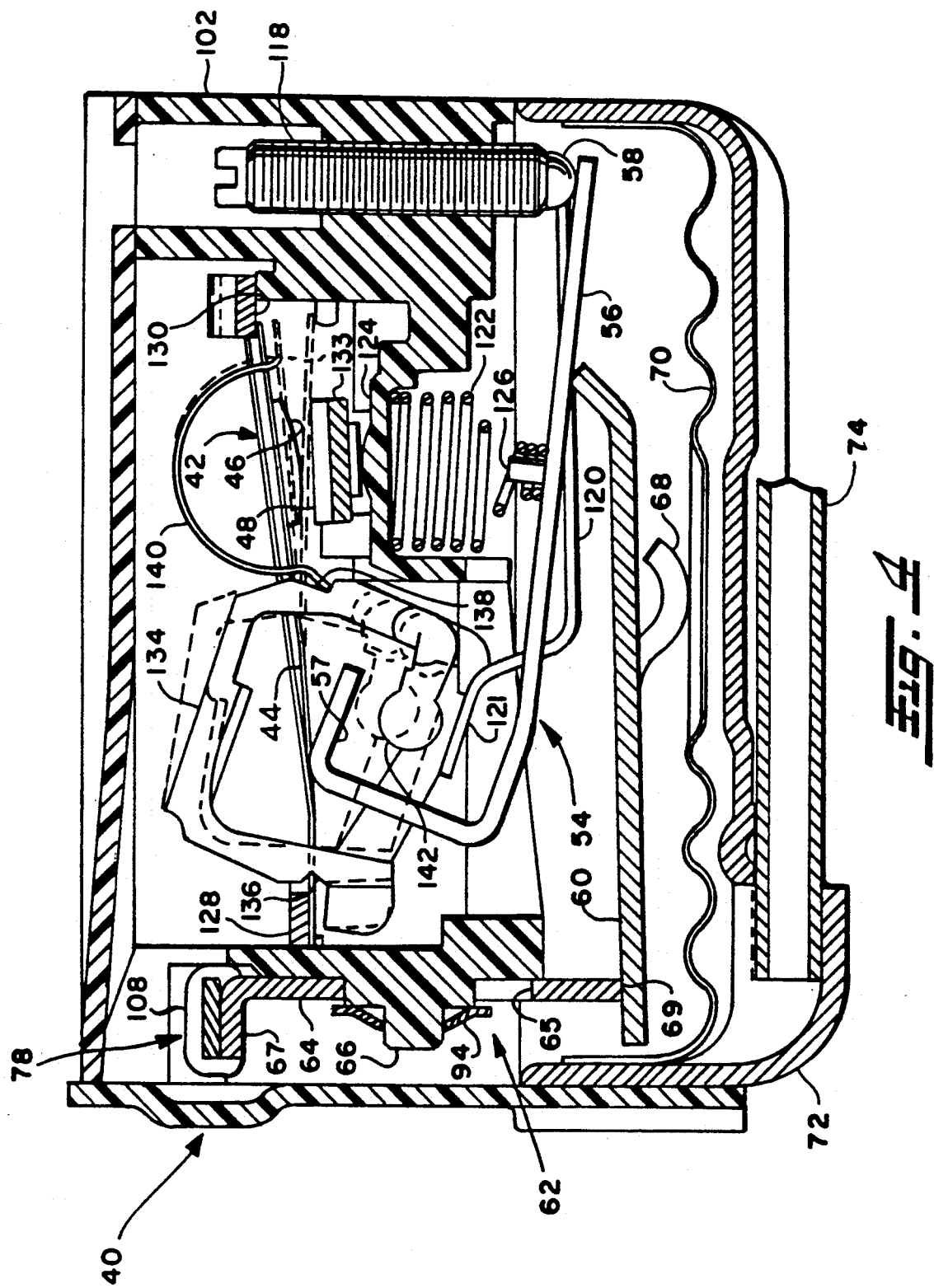
FIG. 4 is a cross-sectional view of the operating mechanism of the thermostat of FIG. 2 taken along section-indicating lines 4—4.

Referring to FIG. 1, a vehicle air conditioning system is indicated generally at 10 employing a compressor 12 driven by a power belt 13 connected to the engine crank shaft pulley (not shown) and drivingly connected to the compressor 12 by an electrically energized clutch 14. The pressurized refrigerant from compressor 12 is discharged along conduit 16 through a condenser 18 which is cooled by a suitable fan 17 driven by motor 19 receiving power along lead 21 from a controller 23 with the other side of the fan motor 19 connected through lead 24 to the system ground. Alternatively, as is well known, the fan may be driven by a power belt from the engine shaft.

The condenser discharges through conduit 20 to the inlet of a thermal expansion means indicated generally at 22 which is typically a mechanically operated thermal expansion valve or capillary. The liquid refrigerant discharges from the expansion means 22 at a lower pressure along conduit 26 which is connected through the inlet of an evaporator indicated generally at 28 and disposed for heat transfer relation with the air in a vehicle passenger compartment.

The vaporized refrigerant from evaporator 28 is discharged along conduit 30 which passes through the expansion device 22 and is connected to conduit 32 for return to the compressor suction inlet.

Fan control 23 receives power through an operator activated switch indicated generally at 34 via junction 36 which is also connected via lead 38 to the thermostat indicated generally at 40.

The thermostat has a switch indicated generally at 42 disposed therein having the base of a movable blade 44 connected to the power lead 38. Blade 44 has a contact 46 mounted adjacent the end thereof which closes against a stationary contact 48 connected via lead 50 to the power terminal of clutch 14 with the opposite side of the clutch connected to the system ground via lead 52. Thus, upon closure of switch 42 the compressor clutch is energized when the operator switch 34 is closed; and, upon opening of switch 42 the compressor clutch 14 is de-energized.

The movable contact of switch 42 is actuated by a lever means indicated generally at 54 which includes a member 56 having one end contacting movable switch blade 44 and the other end pivoted about a stationary fulcrum 58, which is adjustable as will hereinafter be described in greater detail.

The lever means 54 includes a second lever member 60 which is pivoted about a second fulcrum indicated generally at 62 which includes a slidable member 64 movable between limits provided by a stop 66. One end of lever 60 contacts the lever arm 56 with an intermediate portion 68 thereof contacting a movable diaphragm 70 which forms a wall portion of a fluid pressure capsule 72 filled with fluid and connected to a sensing capillary tube 74 which has the end thereof, which may be formed as a bulb 76, if desired, disposed at the desired location in the refrigerant circuit. In the embodiment illustrated in FIG. 1, the sensing bulb 76 is disposed adjacent the discharge line of the evaporator 28 for sensing the temperature of the refrigerant in a saturated vapor state which is assumed to be the saturation temperature of the refrigerant. It will be understood however that the end of capillary 74, or bulb 76, may be disposed at other desired locations for temperature sensing as for example the middle of the evaporator or at the suction return line 32. The particular location of the sensing bulb 76 is determined by the particular location of the refrigerant circuit which is deemed to be critical insofar as controlling the cycling of the compressor clutch.

In general, warming of bulb 76 causes the fluid therein to expand moving diaphragm 70 to pivot member 60 about the fulcrum 62 and move lever 56 to actuate switch 42 for energizing the compressor. When the compressor has caused the evaporator to cool the surrounding air such that the temperature of the evaporator is lowered to the desired level, the fluid in capsule 72 contracts to cause member 60 to pivot in a reverse direction about fulcrum 62 to effect movement of lever 56 in a manner to deactuate switch 42.

The fulcrum 62 is moved by energization of an electrical actuator means indicated generally at 78 which as hereinafter described in greater detail comprises an electrically heated bimetallic element energized by an "operator select" switch 80 which is remote from thermostat 40 and is powered via lead 82 from junction 85 connected to the line switch 34.

Switch 80 is connected via lead 86 to the electrical actuator 78 which has the opposite side thereof connected through lead 88 to the system ground. Power junction 84 is connected to the positive lead of a battery 90 with the negative lead of the battery typically connected to the system ground via lead 92.

With switch 34 closed, when operator select switch 80 is closed the electrical actuator 78 is energized to move fulcrum means 62 from a first to a second position to change the pivot point of the lever 60. Upon opening of the operator select switch 80, the electrical actuator 78 is de-energized and the fulcrum means 62 is moved back to a first position.

Referring now to FIGS. 2, 3 and 4, the thermostat 40 of the present invention is shown in greater detail.

Referring particularly to FIGS. 2 and 3, the fulcrum 62 for the lever means comprises a sliding member 64 having an elongated slot 65 provided therein and which is slidably received over a post or peg 66 which limits the movement of the member 64 in the vertical direction. The member 64 has a right angle tab 67 provided at the upper end thereof which is contacted by and receives thereagainst the driving or moving force of the electrical actuator 78. The member 64 is retained over the post 66 by a suitable retainer such as the pressed-on spring clip 94 which is eliminated in FIG. 2 for clarity. The lower end of member 64 defines a fulcrum or pivot surface 69 for lever 60.

The electrical heater means 78 comprises an elongated bimetal strip 96 received in slots or grooves 98, 100 formed in the side of the thermostat housing 102. The bimetal strip has the ends thereof 104, 106 turned upwardly at generally right angles thereto to provide reaction support for the bimetal. The central portion of the bimetal strip 96 contacts the tab 67 on sliding member 64 generally in the center region thereof. In the presently preferred practice, tab 67 is welded to strip 96. Bimetal strip 96 has a heater coil of resistive conductor material as for example nichrome wire wrapped around the strip 96; and, the coil is denoted by reference numeral 108 in the drawings. The ends of the coil 108 are attached to power leads 110, 112 by switchable electrical connection, preferably weldment, to the ends of the strip which leads are respectively connected to the leads 86 and 88 for connection in the circuit.

Electrical lead 112 is connected to a tab on contact strip 113 which is connected to electrical connector terminal 115 as shown in FIG. 2. Terminal 115 in the system of FIG. 1 is connected to power lead 86. Electrical lead 110 is connected to the metal housing of the capsule 72 and to the system ground.

Referring particularly to FIGS. 3 and 4, the lever member 60 has the left end thereof pivoted about the lower end 69 of the sliding member 64. A tab 68 is formed on lever 60 intermediate the ends thereof for contacting the central region of diaphragm 70 which forms the upper portion of the wall of pressure capsule 72. Capsule 72 is attached to the housing 102 by suitable expedients such as metal brackets, which have been omitted in the drawings for clarity.

The opposite end of the lever member 60 is registered against a second lever member 56 which has the right hand end thereof in FIG. 4 contacting and registered against a stationary pivot 58 comprising the spherical end of an adjustment screw 118 threadably received in the housing 102 for adjustment during calibration. The left hand end of the lever member 56 is formed to a generally U-shaped configuration as denoted by reference numeral 57 in FIG. 4.

The member 56 has a separate spring arm associated therewith denoted by reference numeral 120 which is in generally side-by-side relationship therewith and which arm 120 has the end thereof spaced from the U-shaped portion 57 of arm 56. It will be understood that arm 120 attached to a stationary pivot (not shown) adjacent pivot 58. The member 120 extends in cantilever from its stationary pivot mount with end 121 thereof free.

Arm 56 is biased downwardly by a spring 122 which has its upper end registered against housing portion 124 and its lower end registered over a tab 126 provided on the member 56 such that the spring 122 urges the lever member 56 downwardly against the right hand end of member 60.

With continued reference to FIG. 4, a blade spring 44 is anchored at its left hand end on a suitable mounting ledge (not shown) provided on housing 102 and which is connected to a stop member 130 provided at the opposite end of the blade 44. The stop member 130 and the stationary end of blade 44 at mounting tab 128 are both connected to a common strip and to the electrical terminal connector denoted by reference numeral 132 in FIG. 3. Stationary electrical contact 48 is mounted on a stationary contact strip 133 which is connected to an electrical connector terminal denoted by reference numeral 135 in FIG. 2.

Referring to FIG. 4, a toggle or yoke member 134 has a generally C-shaped configuration and has a notch 136 formed on the outer surface of one side thereof with an edge of blade member 44 near the stationary end thereof received in the notch such that the member 134 is pivoted thereabout. Member 134 has a second notch provided on the outer surface of the side of the generally C-shaped configuration opposite notch 136; and, the second notch 138 has received therein one end of an arcuately shaped beam spring 140 which has its opposite end secured to the end of blade member 44. Beam spring 140 thus biases the notch 136 of the toggle member into contact with the stationary end of blade member 44. One end of the C-shaped toggle member 134 has a rounded stop surface 142 provided thereon which is disposed between the U-shaped end 57 of lever arm 56 and the end of spring arm 120 which thus form limit stops for movement of the toggle member 134.

In operation, as the capillary tube end or bulb 76 senses an increase temperature, fluid within the capillary 74 and capsule 72 expands to cause diaphragm 70 to move upward thereby moving contact tab 68 upward and pivoting lever arm 60 about the fulcrum surface 69.

The right hand end of lever arm 60 moves lever arm 56 about stationary pivot 58 causing the U-shaped leg of arm 56 to move upward.

The right hand end of arm 56 also contacts arm 120 moving it upward causing the free end 121 thereof to contact surface portion 142 of yoke 134 pivoting the yoke 134 counterclockwise about the stationary blade at notch 136. As the yoke member 134 pivots counterclockwise and moves notch 138 and the beam spring 140 upwardly, beam spring 140 goes through an overcenter relationship with respect to blade member 44 causing the beam spring 140 to bias the blade member 44 in a snap-action movement to a downward condition, shown in dashed outline in FIG. 4, thereby closing contacts 46 and 48.

The yoke member 134 is shown in solid outline in FIG. 4 in its at-rest condition biased clockwise about notch 136 in a downward position against a stop (not shown) provided in the housing by the action of the end of spring 140. In the actuated condition the yoke member 134 is rotated upwardly to the position shown in dashed outline in FIG. 4; and, the stop surface 142 contacts the leg of the U-shaped end 57 of lever arm 56 which thus acts as a limit stop for clockwise rotation of yoke 134.

As the temperature of the refrigerant in the evaporator drops, the fluid in bulb 76, capillary 74 and capsule 72 contracts lowering diaphragm 70 to permit the lever arm 60 to pivot clockwise about fulcrum surface 69 and lower the lever arm 56 in counterclockwise movement about stationary pivot 58. As the lever arm 56 is lowered, the surface 142 of the yoke 134 is pulled downwardly by U-shaped end 57 of arm 56 causing notch 138 to lower the left end of beam spring 140 downwardly through the overcenter point of blade 44 which results in the beam spring 140 becoming again unstable and the right hand end of the beam spring snaps the end of arm 44 upwardly against the stop 130 to break the circuit connection between contacts 46 and 48 thereby opening the switch.

The electrical actuator means for fulcrum means 62 is shown in the actuated or energized condition in FIG. 4 wherein the fulcrum member 64 has been moved downwardly to the full extend of its movement with the upper end of slot 65 resting against the surface of the stop peg 66 thus holding fulcrum surface 67 in its lowest position. In this lowest position, the lever 60 is positioned to cause the lever arm 56 and yoke 134 to actuate switch 42 at the lowest level of upper limit temperature for the vehicle passenger compartment. In other words, the compressor clutch is energized at a lower temperature corresponding to the "Maximum Cool Down" mode of operation.

In the presently preferred practice in the "Maximum Cool Down" mode the thermostat is set to cut in the compressor, or close switch 42 in the range 32 degrees–45 degrees F. (0–8 degrees C.) and cut out or open switch 42 in the range 25 degrees–32 degrees F. (−6–0 degrees C.). In the "Economy" mode, the compressor switch 42 is closed in the range 38 degrees–50 degrees F. (3–10 degrees C.) and opened in the range 32 degrees–38 degrees F. (0–3 degrees C.).

If the vehicle operator or user wishes to operate the air conditioning system in the "Economy" mode of operation, the operator select switch 80 is closed thereby energizing the electrical actuator means 78 by causing a flow of electrical current through coil 108 and heating the bimetal strip 96. Heating causes the strip 96 to flex upwardly in a manner causing it to increase its amount of bow thereby permitting tab member 67 to move upwardly and member 64 moves upwardly until the lower end of slot 65 rests against the undersurface of stop peg 66. This permits the left hand end of lever member 60 to move upwardly thereby raising the tab 68 so that movement of the lever arm 60 about fulcrum surface 67 by diaphragm 70 occurres at a higher temperature. Thus, the switch 42 is not closed until such higher temperature is reached thereby delaying the energization of the compressor clutch. This provides the "Economy" mode of operation inasmuch as the compressor is not cycled as often or in other words, does not operate for as long a period of time.

If reverse operation is desired with respect to the operator select switch 80, the bimetal member 86 may be reversed such that in the unheated condition it achieves its maximum amount of upward bowing and in the heated condition moves downwardly.

The present invention thus provides a unique and novel method of operation of a refrigeration or vehicle air conditioning system wherein a remote operator select switch is provided for changing the mode of operation of the system. In one position of the operator select switch an electrically energized actuator is de-energized to cause a thermostat sensing evaporator temperature to have a first or lower temperature of actuation for energizing the compressor. When the operator select switch is moved to a second position, the electrical actuator is energized to cause the thermostat to have a second actuation temperature to change the temperature limit at which the compressor is energized for cooling of the compartment. In the preferred practice of the invention, the thermostat is a mechanical device employing expanding fluid in a pressure capsule connected to a capillary for sensing evaporator temperature. The expansion of the capsule moves a lever means which actuates a snap acting switch for energizing the compressor. The electrical actuator means for moving the lever means fulcrum comprises a heated bimetal strip which moves a sliding member for changing the fulcrum of the lever means to change the actuation point of the snap acting switch.

The present invention thus permits the operator select switch to be located remotely from the compressor clutch cycling thermostat to enable the operator to select either an "Economy" or "Maximum Cool Down" mode of operation. The present invention utilizes a mechanical thermostat which may have its actuation temperature changed electrically by remote actuation of a switch and thus maintains the reliability and low manufacturing cost of a mechanical thermostat, yet permits the flexibility and convenience of electrical control of the operation of the thermostat.

Although the invention has been described hereinabove with respect to the illustrated embodiment, it will be understood that the invention is capable of modification and variation and limited only by the following claims.

I claim:

1. An air conditioning system for a motor vehicle comprising:
   (a) pump means adapted for driving by the vehicle motor and operable to provide at the discharge side thereof a source of pressurized refrigerant;
   (b) clutch means operable upon energization to drivingly couple said pump means to the vehicle motor;
   (c) condenser means operable to liquify refrigerant discharged from said pump means;
   (d) expansion means receiving said pressurized liquid refrigerant from said condenser means and operable for controlling flow thereof at a significantly reduced pressure;

(e) evaporator means receiving liquid refrigerant from said expansion means and operable to effect vaporization of said refrigerant by absorbing heat from the surrounding environment;

(f) conduit means connecting said evaporator means to the inlet of said pump means;

(g) thermostat means having:
  (i) a switch operatively connected in circuit and upon actuation and deactuation effecting energizing and de-energizing said clutch means;
  (ii) remote sensing means operative to sense the temperature of said refrigerant circuit at a desired location thereon;
  (iii) actuator means responsive to said sensing means and operable to effect actuation and deactuation of said switch at preselected levels of said sensed temperature;
  (iv) electrical means operable upon selective user energization to change the position of said actuator means for changing said preselected level of said sensed temperature, wherein the user is able to select a first or second mode of temperature response of said compressor clutch means.

2. The system defined in claim 1, wherein said remote sensing means is operative to sense the temperature of said refrigerant circuit at said evaporator.

3. The system defined in claim 1, wherein said temperature sensing means includes a diaphragm pressure capsule connected to a liquid filled bulb and capillary.

4. The system defined in claim 1, wherein said actuator means includes a lever means and said resistance means is operable to move the fulcrum of said lever means.

5. The system defined in claim 1, wherein said resistance means includes a bimetal member.

6. The system defined in claim 1, wherein said resistance means includes a bimetal member and a heater coil operative upon flow of current therethrough to effect movement of said bimetal member.

7. The system defined in claim 1, wherein said user election is remote from said housing means.

8. A method of changing the mode of operation of a vehicle air conditioning system of the type having a compressor circulating energized by an electrically operated clutch for circulaging refrigerant through a condenser and evaporator comprising the steps of:
  (a) providing a sensor for sensing the temperature of the refrigerant circulating through the evaporator;
  (b) moving a fulcrummed lever means in response to changes in said sensed temperature;
  (c) actuating a compressor switch in response to movement of said lever means;
  (d) selectively energizing an electrical actuator and changing the fulcrum of said lever means and changing the sensed temperature at which the compressor is energized.

* * * * *

UNITED STATES PATENT AND TRADEMARK OFFICE
CERTIFICATE OF CORRECTION

PATENT NO. : 5,083,437

DATED : January 28, 1992

INVENTOR(S) : M. F. Chacon

It is certified that error appears in the above-identified patent and that said Letters Patent is hereby corrected as shown below:

Column 10, Line 18: After "compressor", delete "circulating"

Column 10, Line 19: "circulaging" should read --circulating--

Signed and Sealed this

Twentieth Day of July, 1993

Attest:

MICHAEL K. KIRK

Attesting Officer     Acting Commissioner of Patents and Trademarks